(12) United States Patent
Hoshino

(10) Patent No.: US 6,888,695 B2
(45) Date of Patent: May 3, 2005

(54) INFORMATION RECORDING AND REPRODUCING APPARATUS HAVING HIGHER DRIVE PULSE FREQUENCY DURING SEEKING OPERATION THAN DURING FOLLOWING OPERATION

(75) Inventor: Takayuki Hoshino, Osaka (JP)

(73) Assignee: Minolta Co., Ltd., Osaka (JP)

( * ) Notice: Subject to any disclaimer, the term of this patent is extended or adjusted under 35 U.S.C. 154(b) by 247 days.

(21) Appl. No.: 10/282,002

(22) Filed: Oct. 29, 2002

(65) Prior Publication Data

US 2003/0086198 A1 May 8, 2003

(30) Foreign Application Priority Data

Nov. 2, 2001 (JP) ........................................ 2001-337385

(51) Int. Cl.$^7$ .............................................. G11B 5/596
(52) U.S. Cl. ............................... 360/77.06; 360/78.06; 360/78.05
(58) Field of Search .............................. 369/43, 44.13; 360/75, 77.02, 77.06, 78.06, 78.04, 78.05, 78.12, 78.13

(56) References Cited

U.S. PATENT DOCUMENTS 6,417,983 B1 * 7/2002 Yatsu ...................... 360/77.04
6,721,124 B2 * 4/2004 Chang et al. ............. 360/78.05
2001/0036035 A1 * 11/2001 Morris et al. ............. 360/78.05

FOREIGN PATENT DOCUMENTS

| JP | 2001-76443 | 3/2001 |
| JP | 2001-211669 | 8/2001 |

\* cited by examiner

*Primary Examiner*—Alan T. Faber
(74) *Attorney, Agent, or Firm*—McDermott Will & Emery LLP

(57) ABSTRACT

An information recording and reproducing apparatus having a high track density, a high recording density in each of the tracks, and a short seeking time. In a seeking operation, a control circuit performs a calculation required for the seeking operation and then sets, to (f=fs), a drive pulse frequency f for a tracking control to be supplied to a piezoelectric element based on the calculation result. A drive circuit outputs a drive pulse of the frequency f corresponding to the input drive pulse to an actuator, so that a recording and reproducing head is moved near a target track. In a following operation, the control circuit performs a calculation required for following operation and then sets, to (f=ft, wherein fs>ft), the drive pulse frequency f to be supplied to the piezoelectric element based on the calculation result.

16 Claims, 6 Drawing Sheets

INFORMATION RECORDING AND REPRODUCING APPARATUS HAVING HIGHER DRIVE PULSE FREQUENCY DURING SEEKING OPERATION THAN DURING FOLLOWING OPERATION

This application is based on Application No. JP 2001-337385 filed in Japan, the contents of which are hereby incorporated by reference.

BACKGROUND OF THE INVENTION

1. Field of the Invention

The present invention relates to an improved information recording and reproducing apparatus. More particularly, the present invention relates to an information recording and reproducing apparatus, in which a drive device using an electromechanical transducer allows a recording and reproducing head to track an information recording track formed on a recording medium.

2. Description of the Related Art

There has been increased a demand for a hard disk device (hereinafter simply referred to as a disk device) of a small size and a large capacity for use in a personal computer. In order to increase the storage capacity of the disk device, it is required to narrow a mutual interval between information recording tracks (hereinafter simply referred to as a track) formed on a disk (i.e., a track density) and increase a recording density on each of the tracks. For the purpose of fulfilling such a demand for a high recording density of the disk device, it is necessary to provide a tracking mechanism for positioning a recording and reproducing head with respect to a target track formed on the disk with high accuracy. Incidentally, the recording and reproducing head signifies a head for performing both or either one of writing and reading information in and from the disk.

As the tracking mechanism for the recording and reproducing head in the disk device, there has been known a tracking mechanism consisting of an actuator using a voice coil motor and an actuator using a piezoelectric element. However, it has been pointed out that such a tracking mechanism has inconveniences such as a complicated structure, fabrication at a high cost and a low reliability.

Thus, the present applicants have proposed a tracking mechanism including a drive mechanism (an actuator) using an electromechanical transducer, as disclosed in the gazette of Japanese Unexamined Patent Application No. 11-251426.

This tracking mechanism uses an actuator actuated in two kinds of drive modes: in a rough movement mode, in which a drive pulse is supplied to a piezoelectric element as one type of electromechanical transducers, to generate expansion and contraction displacement vibrations at different speeds, that is, an expansion speed and a contraction speed, so that a driving member and a moving member frictionally coupled to the driving member are moved relatively to each other, thereby allowing the moving member to be moved in a wide range; and in a fine movement mode, in which a DC voltage is applied to the piezoelectric element, so that the moving member can be moved with high accuracy by an expansion displacement or a contraction displacement generated in the piezoelectric element, wherein a recording and reproducing head is fixed to the moving member.

At the time of seeking, i.e., when a desired track is sought and the recording and reproducing head is moved to the track, the drive pulse is supplied to the piezoelectric element in the rough movement mode, so that the recording and reproducing head is speedily moved to the desired track; in contrast, at the time of following, i.e., when the recording and reproducing head is allowed to precisely follow the desired track with high accuracy, the drive mode is switched to the fine movement mode, and then, the DC voltage is applied to the piezoelectric element, thereby finely moving the moving member.

With the configuration disclosed in the above-described gazette, the drive pulse of a rectangular wave form (hereinafter referred to as a rectangular wave) is supplied to the piezoelectric element in the rough movement mode, the moving speed of the moving member, i.e., the recording and reproducing head is adjusted by varying a duty ratio D (a ratio ON/(ON+OFF)) of the rectangular wave. This produces a merit that a drive circuit for supplying the drive pulse can be achieved by a simple circuit using a transistor device capable of an ON/OFF control.

Also in the fine movement mode, it was convenient that the moving speed of the recording and reproducing head was adjusted by varying the duty ratio D of the rectangular wave. However, the recording and reproducing head cannot be finely moved in the fine movement mode by varying the duty ratio D of the rectangular wave for the reasons described below. Thus, in the prior art, as described above, the moving member is moved with high accuracy with an expansion displacement or a contraction displacement generated with the application of the DC voltage to the piezoelectric element in the fine movement mode.

FIG. 7 is a graph illustrating the interrelationship among the frequency f and duty ratio D of a drive pulse (a rectangular wave) to be supplied to a piezoelectric element and a moving speed V of a recording and reproducing head in an actuator using the piezoelectric element, wherein it is shown that even if the duty ratio D is constant, the moving speed V can be varied according to the frequency f of the rectangular wave.

In other words, a curve A shows the relationship between the duty ratio D and the moving speed V of the recording and reproducing head when the frequency f of the rectangular wave is low (f=ft, wherein fs>ft); in contrast, a curve B shows the relationship between the duty ratio D and the moving speed V of the recording and reproducing head when the frequency f of the rectangular wave is high (f=fs, wherein fs>ft).

When the duty ratio D falls in the vicinity of 0.25 (or 0.75), the moving speed V of the recording and reproducing head becomes maximum both when the frequency f is low and when the frequency f is high. However, since the number of pulses per unit time is greater when the frequency f is higher, the maximum of the moving speed V is greater than that when the frequency f is lower.

In contrast, when the duty ratio D falls in a low speed region in the vicinity of 0.5 or 0.0 (also at 1.0), the recording and reproducing head slides in a moving direction, resulting in the generation of a neutral zone N in which the moving speed V is never varied in response to the variations in the duty ratio D, as illustrated in FIG. 7. As is obvious from FIG. 7, the width of the neutral zone N is greater as the frequency f is higher; on the contrary, it is smaller as the frequency f is lower. As a consequence, the characteristics of the neutral zone have made the low speed region unsuitable for low-speed driving.

Tracking operations in the information recording and reproducing apparatus include a seeking operation by which the recording and reproducing head is speedily moved to a target track and a following operation by which the recording and reproducing head is allowed to follow on the target track with high accuracy.

High speed performance is required for the seeking operation, that is, the moving speed of the recording and reproducing head need be high. In the meantime, it is important that the following operation has performances of the positioning accuracy of a high resolution and the linearity in which the moving speed is linearly varied according to the variations in the duty ratio D in the low-speed region.

In the case where a speed control method for varying the moving speed of the recording and reproducing head according to only the variations in the duty ratio D is adopted in the tracking mechanism, the drive circuit can be configured more simply than that in the speed control method in which the rough movement mode and the fine movement mode are switched, as disclosed in the above-descried gazette. However, there has arisen a serious problem that both of the characteristics of the neutral band and the high speed must be achieved in the low-speed region in the vicinity of a duty ratio D of 0.5.

In the following operation by which the recording and reproducing head is allowed to precisely follow the track, the recording and reproducing head detects a positional error between the center of the recording and reproducing head and the center of the track, and then, performs a feedback control so as to set the positional error to zero. At this time, it is necessary to move the recording and reproducing head at a fine speed in both of positive and negative directions.

However, when the recording and reproducing head is to be moved at a fine speed in both of positive and negative directions only by varying the duty ratio D, the above-described characteristics of the neutral band in the low-speed region hinder the generation of the fine speed, and therefore, the positioning accuracy in the following operation is degraded, thereby raising a problem that the track interval cannot become small, that is, a high recording density cannot be achieved.

As described above, if the frequency of the drive pulse is decreased, the width of the neutral zone becomes small, and thus, the fine speed can be achieved. However, the maximum of the moving speed becomes small, thereby raising a problem that a time required for the seeking operation is prolonged.

Furthermore, the moving speed of the recording and reproducing head during the seeking operation is decreased from the maximum speed when the recording and reproducing head is moved to a desired track down to about zero when the recording and reproducing head approaches the desired track. When the recording and reproducing head approaches the desired track, the recording and reproducing head cannot be moved at the fine speed due to the above-described characteristics of the neutral band, thereby raising a problem that the desired track cannot be sought finally.

OBJECTS AND SUMMARY

The present invention has been accomplished in an attempt to solve the above problems observed in the prior art. An object of the present invention is to provide an improved information recording and reproducing apparatus. More particularly, an object of the present invention is to provide an improved information recording and reproducing apparatus, in which a drive device using an electromechanical transducer allows a recording and reproducing head to track an information recording track formed on a recording medium.

In order to achieve the above-described and other objects, an information recording and reproducing apparatus in an aspect according to the present invention comprises: an electromechanical transducer; a driving member fixed to one end of the electromechanical transducer; a moving member frictionally coupled with the driving member; and a drive circuit for supplying a drive pulse to the electromechanical transducer so as to generate expansion and contraction displacement vibrations at different speeds, i.e., an expansion speed and a contraction speed in the electromechanical transducer, and then, allowing a recording and reproducing head to track an information recording track formed on a recording medium by the use of a drive mechanism for relatively moving the driving member and the moving member to each other; the drive circuit driving the electromechanical transducer by using drive pulse frequencies which are different at the time of seeking and following.

Furthermore, the drive circuit drives the electromechanical transducer in such a manner that the drive pulse frequency at the time of seeking is higher than that at the time of following.

Moreover, the drive circuit drives the electromechanical transducer by the use of the drive pulses having duty ratios which are different at the time of seeking and following.

Otherwise, an information recording and reproducing apparatus in another aspect according to the present invention comprises: an electromechanical transducer; a driving member fixed to one end of the electromechanical transducer; a moving member frictionally coupled with the driving member; and a drive circuit for supplying a drive pulse to the electromechanical transducer so as to generate expansion and contraction displacement vibrations at different speeds, i.e., an expansion speed and a contraction speed in the electromechanical transducer, and then, allowing a recording and reproducing head to track an information recording track formed on a recording medium by the use of a drive mechanism for relatively moving the driving member and the moving member to each other; the drive circuit driving the electromechanical transducer in such a manner that the drive pulse frequency at the time of seeking is lower than a frequency up to that time from at least one preceding track immediately before the completion of seeking.

Alternatively, an information recording and reproducing apparatus in a further aspect according to the present invention comprises: an electromechanical transducer; a driving member fixed to one end of the electromechanical transducer; a moving member frictionally coupled with the driving member; and a drive circuit for supplying a drive pulse to the electromechanical transducer so as to generate expansion and contraction displacement vibrations at different speeds, i.e., an expansion speed and a contraction speed in the electromechanical transducer, and then, allowing a recording and reproducing head to track an information recording track formed on a recording medium by the use of a drive mechanism for relatively moving the driving member and the moving member to each other; the drive circuit varying the drive pulse frequency at the time of following according to the moving speed of the recording and reproducing head at the time of seeking.

Additionally, the drive circuit sets the drive pulse frequency f at the time of seeking as expressed by the following equation:

$$f = ft0 + a \cdot V$$

wherein V represents the moving speed of the recording and reproducing head at the time of seeking; $ft0$ represents a drive pulse frequency at the time of following calculated based on variations in a positional error signal read by the recording and reproducing head; and a represents a constant.

BRIEF DESCRIPTION OF THE DRAWINGS

These and other objects and features of the present invention will become apparent from the following description of preferred embodiments thereof taken in conjunction with the accompanying drawings, in which.

In the following description, like parts are designated by like reference numerals throughout the several drawings.

DETAILED DESCRIPTION OF THE PREFERRED EMBODIMENTS

Preferred embodiments according to the present invention will be described below in reference to the accompanying drawings.

[First Embodiment]

Figure 1:
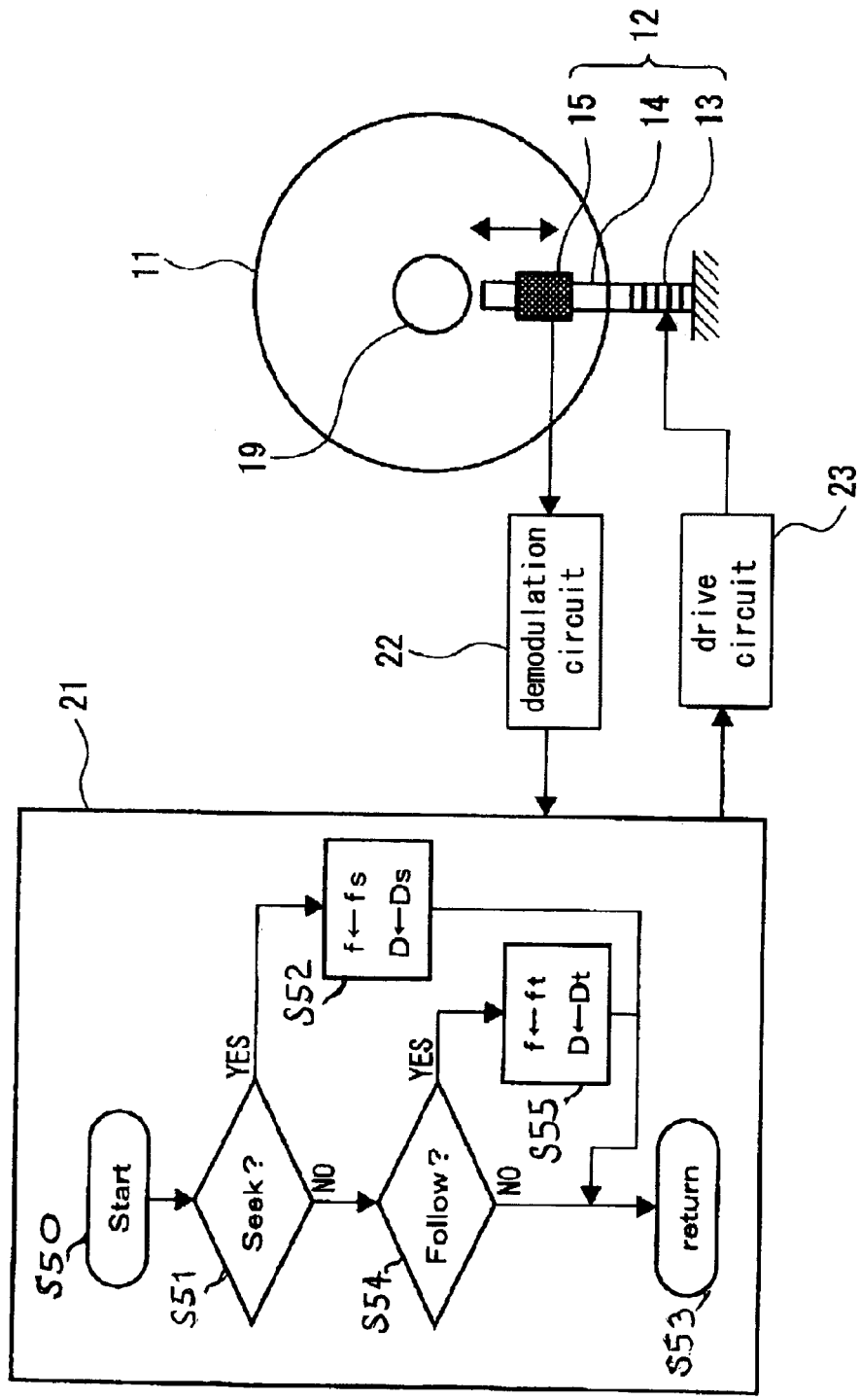
FIG. 1 is a diagram illustrating the arrangement of a tracking controller and a control circuit in an information recording and reproducing apparatus in a first preferred embodiment.
Figure 2:
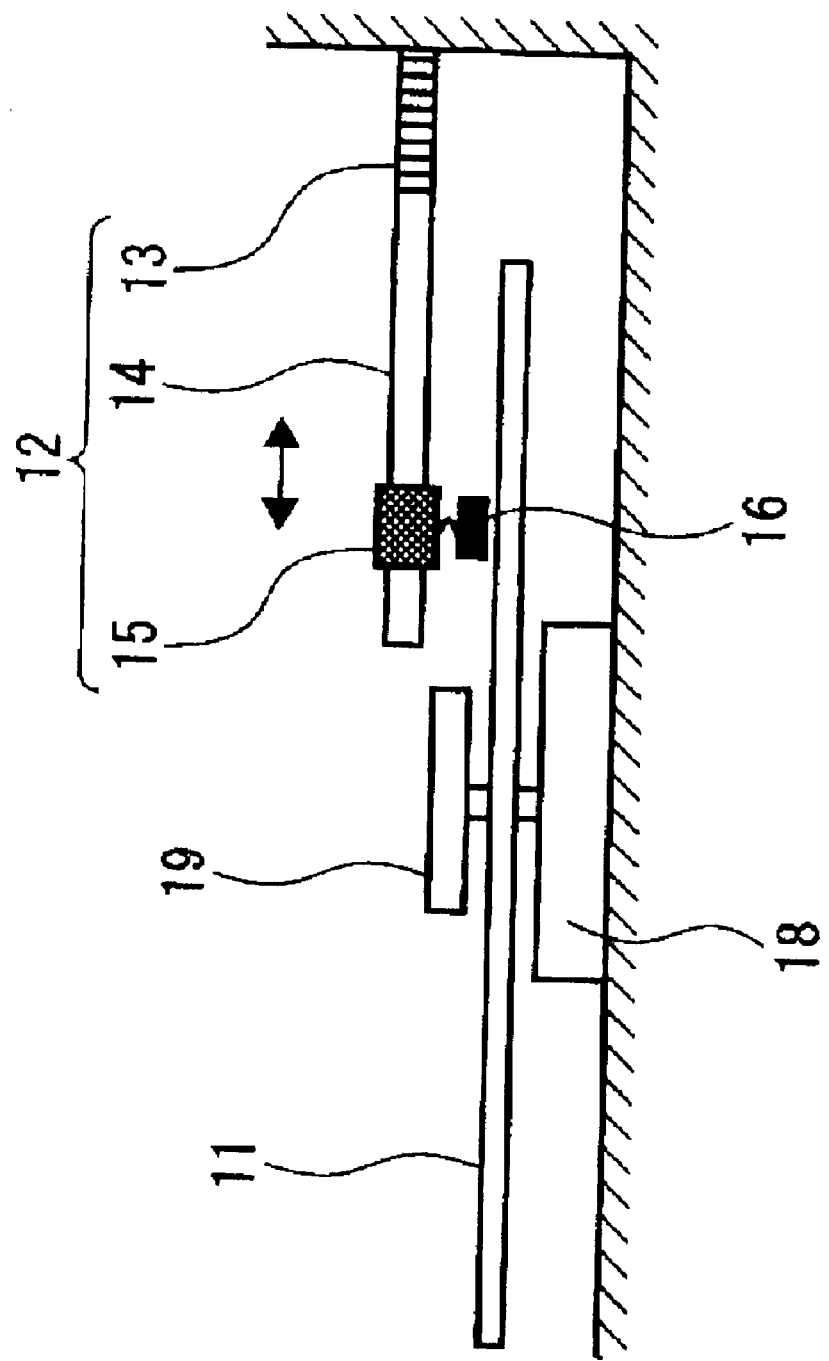
FIG. 2 is a side view showing the tracking controller illustrated in FIG. 1.

FIGS. 1 and 2 are a diagram and a view respectively explanatory of the arrangement of a tracking controller in an information recording and reproducing apparatus in a first preferred embodiment according to the present invention: FIG. 1 is a diagram illustrating the arrangement of the tracking controller and a control circuit; and FIG. 2 is a side view showing the arrangement of the tracking controller.

In FIGS. 1 and 2, reference numeral 11 designates a disk for recording information, and reference numeral 12 denotes a straight-ahead drive mechanism, that is, an actuator for allowing a recording and reproducing head to follow a desired track. The actuator 12 includes a piezoelectric element 13, which is one type of electromechanical transducers, a drive shaft 14 constituting a driving member and a slider 15 constituting a moving member.

Reference numeral 18 designates a motor for rotatably driving the disk 11 for recording information, and 19 denotes a disk cap fixed to a spindle of the motor 18.

A control circuit 21 is adapted to control the frequency of a drive pulse (i.e., a rectangular wave) to be supplied to the piezoelectric element 13 for the purpose of the tracking control in the information recording and reproducing apparatus, and is composed of a microcomputer. To input and output ports are respectively connected a demodulation circuit 22 for processing an information signal output from a recording and reproducing head 16 and a drive circuit 23 for supplying the drive pulse (i.e., the rectangular wave) to the piezoelectric element based on a signal output from the control circuit 21.

Incidentally, only parts for processing information on a tracking control in the control circuit are illustrated here. Parts in the circuit for recording and reproducing general information in and from the disk 11 have no direct relationship with the explanation of the tracking control, and therefore, illustration and explanation will be omitted below.

Next, a description will be given of the arrangement and actuation of the actuator 12. As described above, the actuator 12 includes the piezoelectric element 13, the drive shaft 14 and the slider 15. One end of the piezoelectric element 13 is adhesively fixed to a frame, not shown, and the other end thereof is adhesively fixed to the drive shaft 14. With the drive shaft 14 is frictionally coupled the slider 15 with an appropriate frictional coupling force. To the slider 15 is attached the recording and reproducing head 16.

When a drive pulse is supplied from the drive circuit 23 to the piezoelectric element 13 under the control of the control circuit 21, the piezoelectric element 13 generates vibrations at expansion and contraction displacement speeds which are different from each other, and further, the drive shaft 14 adhesively fixed to the piezoelectric element 13 also generates vibrations at expansion and contraction speeds which are different from each other. When the piezoelectric element 13 is slowly displaced to be expanded (or contracted), the slider 15 frictionally coupled with the drive shaft 14 is moved together with the drive shaft 14; in contrast, when the piezoelectric element 13 is rapidly displaced to be contracted (or expanded), the slider 15 frictionally coupled with the drive shaft 14 stays at that position since the force of inertia is greater than the frictional coupling force, and thus, the slider 15 is moved relatively to the drive shaft 14. As a consequence, the slider 15 is moved in a predetermined direction.

Subsequently, explanation will be made on the tracking control of the recording and reproducing head by the use of the actuator 12.

First, a seeking operation will be described below. Tracks for recording information are coaxially or spirally recorded in advance on the disk 11. From the recording and reproducing head 16 is read a signal indicating information inclusive of track identifying information for identifying a track, at which the head is positioned, and positional error information on a distance between the center of the track and the center of the head 16.

The read information signal is input into the demodulation circuit 22, which then demodulates a positional error signal based on the input information signal. Thereafter, the demodulated positional error signal is input into the control circuit 21 where processing begins at S50.

When a control circuit, not shown, for performing the entire control instructs the control circuit 21 to perform a seeking operation (YES at S51), the control circuit 21 confirms the position of the head based on the track identifying information read by the recording and reproducing head 16, and then, counts the number of tracks up to a target track. Furthermore, the control circuit 21 performs a calculation required for the seeking operation such as a calculation of the moving speed V of the recording and reproducing head 16 according to the variations in the read positional error signal.

Moreover, the control circuit 21 sets (S52), to (f=fs), the frequency f of the drive pulse (i.e., a rectangular wave) for a track control, which is supplied to the piezoelectric element based on the calculation result, sets a duty ratio D to (D=Ds), and thus, outputs the information on the drive pulse (i.e., the rectangular wave) of the set frequency f (f=fs) and the set duty ratio D (D=Ds) to the drive circuit 23. The processing in control circuit 21 then moves to S53 to Return to S50.

The drive pulse of the frequency f and the duty ratio D corresponding to the information on the input drive pulse (i.e., the input rectangular wave) is output from the drive circuit 23, to be then supplied to the piezoelectric element 13 in the actuator 12. The recording and reproducing head 16 is moved near the target track by the actuation of the actuator 12, and thus, the seeking operation comes to an end.

Here, when the recording and reproducing head 16 is moved ahead of the target track by at least one track in moving the recording and reproducing head 16 near the target track during the seeking operation, the frequency f of the drive pulse (i.e., the rectangular wave) may be reset to a frequency lower than the frequency up to that time. Consequently, the recording and reproducing head 16 is allowed to approach ahead of the target track by one or several tracks at a high speed, and thereafter, it can be accurately moved to the target track at a lower speed.

Upon completion of the seeking operation, information indicating the completion is input into the control circuit, not shown, for performing the entire control. In response to this, the control circuit for performing the entire control instructs the control circuit 21 to perform a following operation (NO at S51 and YES at S54).

The control circuit 21 calculates the moving speed V of the recording and reproducing head 16 required for the following operation according to the variations in the positional error signal read by the recording and reproducing head 16.

Moreover, the control circuit 21 sets (S55), to (f=ft), the frequency f of the drive pulse (i.e., the rectangular wave) for the tracking control, which is supplied to the piezoelectric element based on the calculation result, sets the duty ratio D to (D=Dt), and thus, outputs the information on the drive pulse (i.e., the rectangular wave) of the set frequency f (f=ft) and the set duty ratio D (D=Dt) to the drive circuit 23. The processing in control circuit 21 then moves to S53 to Return to S50.

The drive pulse of the frequency f (f=ft) and the duty ratio D (D=Dt) corresponding to the information on the input drive pulse (i.e., the input rectangular wave) is output from the drive circuit 23, to be then supplied to the piezoelectric element 13 in the actuator 12. The recording and reproducing head 16 precisely follows the target track in the following operation by the actuation of the actuator 12.

Here, the frequency ft of the drive pulse (i.e., the rectangular wave) in the following operation is set lower than the frequency fs of the drive pulse (i.e., the rectangular wave) in the seeking operation (fs>ft), thereby eliminating an influence of the neutral zone, which has been described already, as possible.

In the case where the duty ratio D of the drive pulse (i.e., the rectangular wave) is set to 0.5, the displacement of the drive shaft 14 in the actuator 12 takes substantially a sinusoidal waveform, so that the accelerations of the expansion and contraction displacements become equal to each other. Consequently, the recording and reproducing head 16 cannot be moved. In contrast, in the case where the duty ratio D is, for example, 0.3, the displacement of the drive shaft 14 takes substantially a saw-tooth waveform, so that the accelerations of the expansion and contraction displacements become different from each other. Consequently, the recording and reproducing head 16 is moved in a direction in which the acceleration is small. In this manner, the setting manner of the duty ratio D enables the moving direction and magnitude of the recording and reproducing head 16 to be controlled.

As described above, the control circuit 21 determines the frequency ft and the duty ratio Dt of the drive pulse (i.e., the rectangular wave) for the tracking control based on the positional error signal read by the recording and reproducing head 16 in the following operation, allows the actuator 12 to be actuated, and performs a feedback control such that the positional error signal becomes zero. Thus, the recording and reproducing head 16 can precisely follow the center of the track on the disk 11.

[Second Embodiment]

Figure 3:
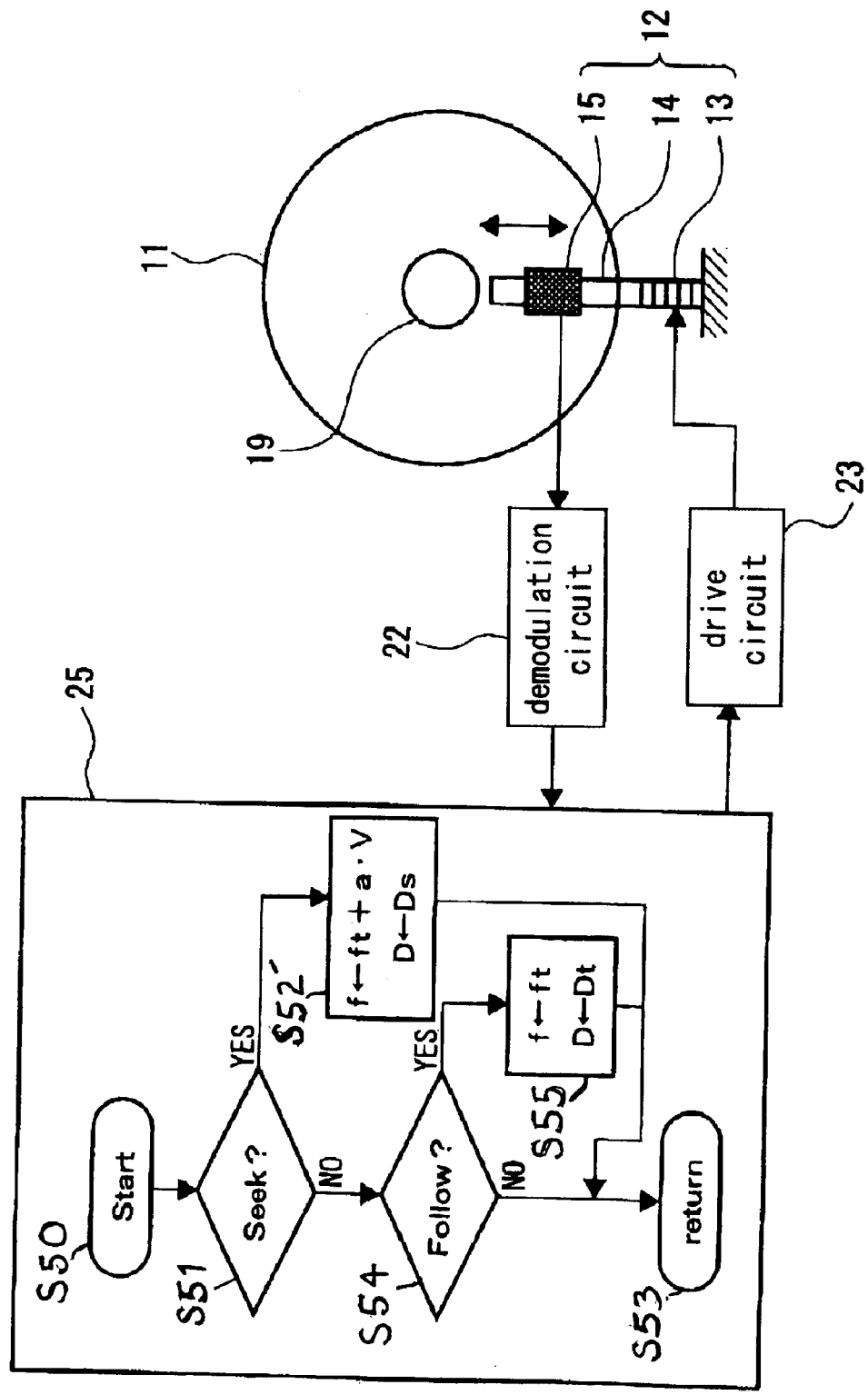
FIG. 3 is a diagram illustrating the arrangement of a tracking controller and a control circuit in an information recording and reproducing apparatus in a second preferred embodiment.

FIG. 3 is a diagram illustrating the arrangement of a tracking controller and a control circuit in an information recording and reproducing apparatus in a second preferred embodiment according to the present invention.

The tracking controller in the information recording and reproducing apparatus in the second preferred embodiment is different from that in the first preferred embodiment only in the method for determining the frequency of the drive pulse (i.e., the rectangular wave) for the tracking control at the time of seeking which is performed by the control circuit, and is the same as that in the first preferred embodiment in other configurations and the method for determining the frequency of the drive pulse (i.e., the rectangular wave) for the tracking control at the time of following. Therefore, like parts are designated by like reference numerals, and their explanations will be omitted below but only the difference will be described below.

In the second preferred embodiment, a control circuit 25 calculates the moving speed V of a recording and reproducing head 16 according to variations in a positional error signal read by the recording and reproducing head 16.

Moreover, the control circuit 25 determines the frequency f and duty ratio D of the drive pulse (i.e., the rectangular wave) for the tracking control at the time of seeking, which is supplied to a piezoelectric element based on the calculation result.

At this time (S52'), the frequency f of the drive pulse (i.e., the rectangular wave) at the time of seeking is determined by adding a·V obtained by multiplying the moving speed V of the recording and reproducing head 16 at the time of seeking by a constant a to a frequency (ft0) of the drive pulse (i.e., the rectangular wave) at the time of following calculated according to the variations in the positional error signal read by the recording and reproducing head, as expressed by the following equation:

$$f = ft0 + a \cdot V$$

wherein V represents the moving speed of the recording and reproducing head at the time of seeking; ft0 represents a drive pulse frequency at the time of following calculated based on the variations in the positional error signal read by the recording and reproducing head; and a represents the constant.

As a result, when the moving speed V of the recording and reproducing head 16 at the time of seeking is high, the frequency ft of the drive pulse (i.e., the rectangular wave) for the tracking control is set high; in contrast, when the moving speed V of the recording and reproducing head 16 at the time of seeking is low, the frequency ft of the drive pulse (i.e., the rectangular wave) is set low. Since the width of the above-described neutral zone also becomes small, it is possible to satisfactorily eliminate an influence of the neutral zone even when the moving speed of the recording and reproducing head 16 is low, like immediately before the completion of the seeking operation, thus achieving the stable following operation with improved controllability.

[Third Embodiment]

Figure 4:
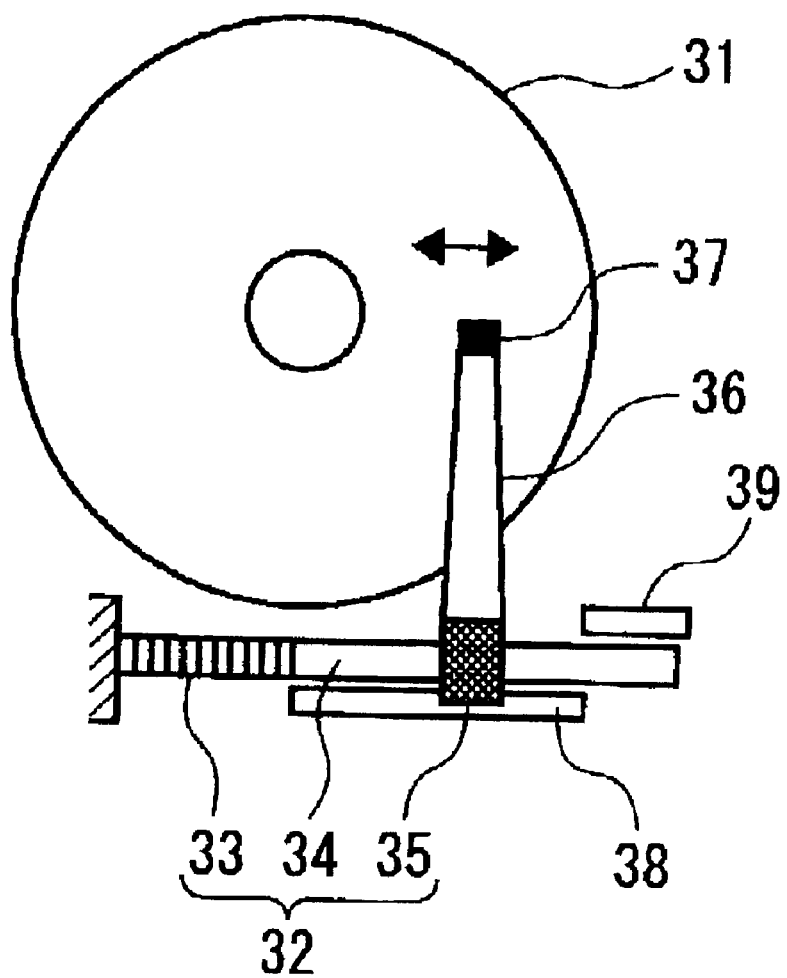
FIG. 4 is a view showing the arrangement of a tracking controller in an information recording and reproducing apparatus in a third preferred embodiment.
Figure 5:
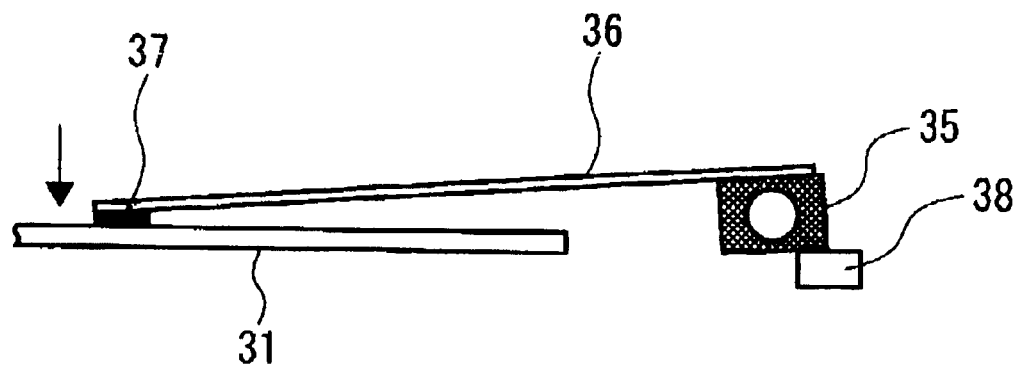
FIG. 5 is a side view showing a recording and reproducing head which is located at a position close to a disk, in the tracking controller in the information recording and reproducing apparatus shown in FIG. 4.
Figure 6:
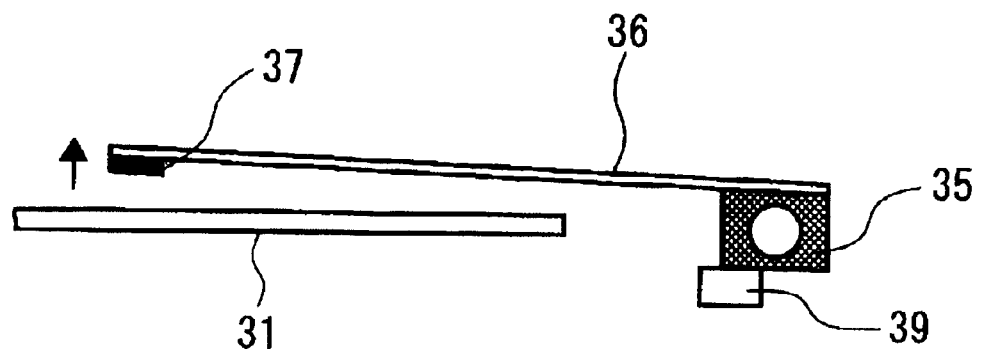
FIG. 6 is a side view showing the recording and reproducing head which is located at a position apart from the disk, in the tracking controller in the information recording and reproducing apparatus shown in FIG. 4.
Figure 7:
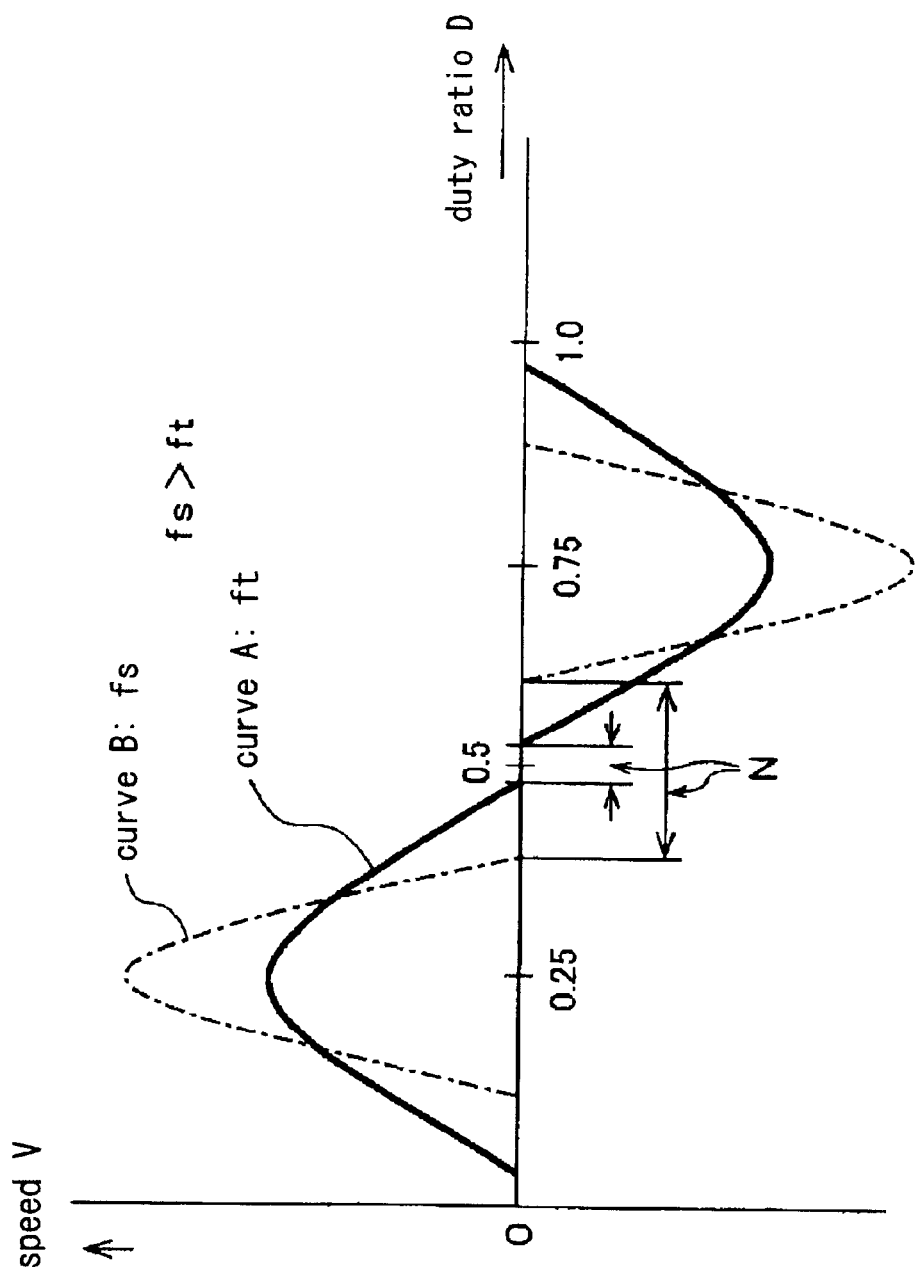
FIG. 7 is a graph illustrating the interrelationship among the frequency f and duty ratio D of a drive pulse to be supplied to a piezoelectric element and a moving speed V of a recording and reproducing head.

FIGS. 4 to 6 are views explanatory of the arrangement of a tracking controller in an information recording and reproducing apparatus in a third preferred embodiment according to the present invention. FIG. 4 is a view showing the arrangement of the tracking controller; FIG. 5 is a side view showing the configuration of a recording and reproducing head which is located at a position close to a disk; and FIG. 6 is a side view showing the configuration of the recording and reproducing head which is located at a position apart from the disk.

In FIGS. 4 to 6, reference numeral 31 designates a disk for recording information, and 32 denotes a straight-ahead actuator for allowing a recording and reproducing head to follow a desired track. The disk 31 for recording information is rotatably driven by a motor, not shown.

The actuator 32 includes a piezoelectric element 33, a drive shaft 34 and a slider 35. One end of the piezoelectric element 33 is adhesively fixed to a frame, now shown, and the other end thereof is adhesively fixed to the drive shaft 34. With the drive shaft 34 is frictionally coupled the slider 35 with an appropriate frictional coupling force. To the slider 35 is fixed a head fixing member 36, to the tip of which a recording and reproducing head 37 is attached. The actuation of the actuator 32 is the same as that described in the first preferred embodiment, and therefore, its explanation will be omitted here.

Under the slider 35, a first acting member 38 and a second acting member 39, which extend along the drive shaft 34, are disposed on a side opposite to the disk 31 in FIG. 4.

The first acting member 38 is adapted to locate the recording and reproducing head 37 at an operating position close to the disk 31 and a retreating position apart from the disk 31. When the recording and reproducing head 37 is placed on the disk 31, the slider 35 is pushed upward from under by the first acting member 38, so that the recording and reproducing head 37 is located at the operating position close to the disk 31. This state is shown in FIG. 5.

In the meantime, when the recording and reproducing head 37 is moved to a right end in FIG. 4, that is, it is not placed on the disk 31, the slider 35 is separated from the first acting member 38, so that the recording and reproducing head 37 is located at the retreating position apart from the disk 31.

The second acting member 39 is adapted to locate the recording and reproducing head 37 at a separating position apart from the disk 31 when a disk device is stopped. When the slider 35 is moved to the end of the drive shaft 34 (to the right end in FIG. 4), the slider 35 rides on the second acting member 39 disposed thereunder, and thus, is pushed upward, so that the recording and reproducing head 37 is located at the separating position apart from the disk 31. This state is shown in FIG. 6.

Explanation will be made on the operation with the above-described configuration. First, when the disk device is in a stopped state, the slider 35 is located at the end of the drive shaft 34 (at the right end in FIG. 4). As shown in FIG. 6, the slider 35 rides on the second acting member 39 disposed thereunder, and thus, is pushed upward, so that the recording and reproducing head 37 is located apart from the disk 31.

The disk device is driven so that the disk 31 is started to be rotated, and consequently, the slider 35 is moved onto the disk 31 by the actuation of the actuator 32. At this time, the slider 35 is pushed upward from under by the first acting member 38, and thus, the recording and reproducing head 37 is located at the operating position close to the disk 31, as shown in FIG. 5. At this position, the recording and reproducing head 37 floats with a fine interval by rotating wind generated by the rotation of the disk 31, and therefore, the disk 31 or the recording and reproducing head 37 can be prevented from being damaged.

As described above, according to the present invention, since the frequency of the drive pulse is set high during the seeking operation in tracking by the recording and reproducing head in the information recording and reproducing apparatus, the recording and reproducing head can be speedily moved to the desired track at a high speed; in contrast, since the frequency of the drive pulse is set low during the following operation, the recording and reproducing head can precisely follow the desired track with high accuracy.

Thus, the high speed performance in the seeking operation and the accurate positioning performance in the following operation, which have been incompatible with each other in the prior art, can be compatible with each other even in the information recording and reproducing apparatus of a large storage capacity, in particular, even in the information recording and reproducing apparatus having a high track density and a high recording density in each of the tracks. Thus, it is possible to provide the information recording and reproducing apparatus of a large capacity and high performance, in which the information can be recorded and reproduced at a high speed.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An information recording and reproducing apparatus comprising:

an electromechanical transducer;

a driving member fixed to one end of the electromechanical transducer;

a moving member frictionally coupled with the driving member; and a drive circuit for supplying a drive pulse to the electromechanical transducer so as to generate expansion and contraction displacement vibrations at different speeds, and allowing a recording and reproducing head to track an information recording track formed on a recording medium by the use of a drive mechanism for relatively moving the driving member and the moving member to each other, wherein the drive circuit driving the electromechanical transducer by using drive pulse frequencies which are different at the time of seeking and following.

2. An information recording and reproducing apparatus according to claim 1, wherein the drive circuit drives the electromechanical transducer in such a manner that the drive pulse frequency at the time of seeking is higher than that at the time of following.

3. An information recording and reproducing apparatus according to claim 1, wherein the drive circuit drives the electromechanical transducer by the use of the drive pulses having duty ratios which are different at the time of seeking and following.

4. An information recording and reproducing apparatus comprising:

an electromechanical transducer;

a driving member fixed to one end of the electromechanical transducer;

a moving member frictionally coupled with the driving member; and a drive circuit for supplying a drive pulse to the electromechanical transducer so as to generate expansion and contraction displacement vibrations at different speeds, and allowing a recording and reproducing head to track an information recording track formed on a recording medium by the use of a drive mechanism for relatively moving the driving member and the moving member to each other, wherein the drive circuit driving the electromechanical transducer in such a manner that the drive pulse frequency at the time of seeking is lower than a frequency up to that time from at least one preceding track immediately before the completion of seeking.

5. An information recording and reproducing apparatus according to claim 4, wherein the drive circuit changes duty ratios of the drive pulses according to the drive pulse frequency.

6. An information recording and reproducing apparatus comprising:

an electromechanical transducer;

a driving member fixed to one end of the electromechanical transducer;

a moving member frictionally coupled with the driving member; and a drive circuit for supplying a drive pulse to the electromechanical transducer so as to generate expansion and contraction displacement vibrations at different speeds, and allowing a recording and reproducing head to track an information recording track formed on a recording medium by the use of a drive mechanism for relatively moving the driving member and the moving member to each other, wherein the drive circuit varying the drive pulse frequency at the time of following according to the moving speed of the recording and reproducing head at the time of seeking.

7. An information recording and reproducing apparatus according to claim 6, wherein the drive circuit sets the drive pulse frequency f at the time of seeking as expressed by the following equation:

$$f = ft0 + a \cdot V$$

wherein V represents the moving speed of the recording and reproducing head at the time of seeking; ft0 represents a drive pulse frequency at the time of following calculated based on variations in a positional error signal read by the recording and reproducing head; and a represents a constant.

8. An information recording and reproducing apparatus according to claim 6, wherein the drive circuit changes duty ratios of the drive pulses according to the drive pulse frequency.

9. A driving method of an information recording and reproducing apparatus having an electromechanical transducer, a driving member fixed to one end of the electromechanical transducer, a moving member frictionally coupled with the driving member, and a drive circuit for driving the electromechanical transducer, the driving method comprising the steps of:

supplying a drive pulse to the electromechanical transducer so as to generate expansion and contraction displacement vibrations at different speeds, and allowing a recording and reproducing head to track an information recording track formed on a recording medium by the use of a drive mechanism for relatively moving the driving member and the moving member to each other as at the time of seeking; and driving the electromechanical transducer as at the time of following by using drive pulse frequencies which are different from at the time of seeking.

10. A driving method of an information recording and reproducing apparatus according to claim 9, wherein the drive circuit drives the electromechanical transducer in such a manner that the drive pulse frequency at the time of seeking is higher than that at the time of following.

11. A driving method of an information recording and reproducing apparatus according to claim 9, wherein the drive circuit drives the electromechanical transducer by the use of the drive pulses having duty ratios which are different at the time of seeking and following.

12. A driving method of an information recording and reproducing apparatus having an electromechanical transducer, a driving member fixed to one end of the electromechanical transducer, a moving member frictionally coupled with the driving member, and a drive circuit for driving the electromechanical transducer, the driving method comprising the steps of:

supplying a drive pulse to the electromechanical transducer so as to generate expansion and contraction displacement vibrations at different speeds, and allowing a recording and reproducing head to track an information recording track formed on a recording medium by the use of a drive mechanism for relatively moving the driving member and the moving member to each other as at the time of seeking; and driving the electromechanical transducer in such a manner that the drive pulse frequency at the time of seeking is lower than a frequency up to that time from at least one preceding track immediately before the completion of seeking.

13. A driving method of an information recording and reproducing apparatus according to claim 12, wherein the drive circuit changes duty ratios of the drive pulses according to the drive pulse frequency.

14. A driving method of an information recording and reproducing apparatus having an electromechanical transducer, a driving member fixed to one end of the electromechanical transducer, a moving member frictionally coupled with the driving member, and a drive circuit for driving the electromechanical transducer, the driving method comprising the steps of:

supplying a drive pulse to the electromechanical transducer so as to generate expansion and contraction displacement vibrations at different speeds, and allowing a recording and reproducing head to track an information recording track formed on a recording medium by the use of a drive mechanism for relatively moving the driving member and the moving member to each other as at the time of following; and varying the drive pulse frequency at the time of following according to the moving speed of the recording and reproducing head at the time of seeking.

15. A driving method of an information recording and reproducing apparatus according to claim 14, wherein the drive circuit sets the drive pulse frequency f at the time of seeking as expressed by the following equation:

$$f = ft0 + a \cdot V$$

wherein V represents the moving speed of the recording and reproducing head at the time of seeking; ft0 represents a drive pulse frequency at the time of following calculated based on variations in a positional error signal read by the recording and reproducing head; and a represents a constant.

16. A driving method of an information recording and reproducing apparatus according to claim 14, wherein the drive circuit changes duty ratios of the drive pulses according to the drive pulse frequency.

* * * * *